United States Patent
Bernabeu-Auban et al.

(10) Patent No.: US 8,539,497 B2
(45) Date of Patent: Sep. 17, 2013

(54) METHOD FOR ORGANIZING SOFTWARE SO THE SET OF EXTENSIONS FOR AN EXTENDABLE APPLICATION CAN BE RUN SECURELY

(75) Inventors: Jose M. Bernabeu-Auban, Sammamish, WA (US); Stephen E. Dossick, Redmond, WA (US); Frank V. Peschel-Gallee, Redmond, WA (US); Stephan J. Zachwieja, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1502 days.

(21) Appl. No.: 11/393,348

(22) Filed: Mar. 30, 2006

(65) Prior Publication Data
US 2007/0239985 A1 Oct. 11, 2007

(51) Int. Cl.
*G06F 9/46* (2006.01)
*H04L 9/32* (2006.01)

(52) U.S. Cl.
USPC .......................................... 718/104; 713/168

(58) Field of Classification Search
None
See application file for complete search history.

(56) References Cited

U.S. PATENT DOCUMENTS

| | | | |
|---|---|---|---|
| 6,601,113 B1 * | 7/2003 | Koistinen et al. | 719/316 |
| 6,618,857 B1 * | 9/2003 | Zimniewicz et al. | 717/175 |
| 2004/0006609 A1 * | 1/2004 | Skrepetos | 709/220 |
| 2005/0246453 A1 * | 11/2005 | Erlingsson et al. | 710/1 |
| 2005/0246718 A1 * | 11/2005 | Erlingsson et al. | 719/317 |

* cited by examiner

*Primary Examiner* — Camquy Truong
(74) *Attorney, Agent, or Firm* — Woodcock Washburn, LLP

(57) ABSTRACT

The operating system organizes software so the set of extensions for an extendable application can be dynamically discovered and the extension can be run securely. Extensions are run as separate applications instead of within the extendable application's process. Extensions are discoverable to an activated extendable application by querying a category catalog. A category provides at least a partial description of a contract between an activating software entity and a software entity that is activated by the activating software entity. The category may enumerate a set of configuration settings associated with the contract that may be used to set up an isolated execution environment for the activated software entity. The category may also specify one or more extension points to be used for communication between the activating and activated software entities. The category may also include a list of software entities that implement the category.

14 Claims, 3 Drawing Sheets

METHOD FOR ORGANIZING SOFTWARE SO THE SET OF EXTENSIONS FOR AN EXTENDABLE APPLICATION CAN BE RUN SECURELY

BACKGROUND

Software is often written so that it can be dynamically extended. That is, an application may be written so that during execution, it can initiate software that extends its original functionality by making an extension point available to the extending software. The extending software typically is activated if and when it is needed or when it is found: that is, it is not necessarily activated when the application is activated. The pieces of software that extend the functionality of an application beyond that provided by the original application are often called extensions.

An extension is often written at a different time and by a different business entity than that which produced the original application which it extends. Activation of an extension by an extendable application thus is often problematic because the code for the extension has not been tested by the developers of the extendable application. Thus, execution of an extension may make the extendable application crash or may have other deleterious effects. In addition, the set of available extensions must be somehow dynamically discovered by the extendable application while the extendable application is executing because when the extendable application is coded, there is no way of knowing what extensions will be available when the extendable application is executed. In known systems, different extendable applications use their own proprietary ways of arranging their extension points and of finding and linking with extensions for those points. As a result, the operating system does not know or understand the relationships between the extendable application and the extension and cannot control or manage them.

In addition, installation of extensions usually results in ad-hoc changes to the state of the machine. For example, files, directories or the contents of files may be changed, in order that the extendable application can be made aware of the available extensions. This state of affairs tends to make managing the machine problematic for users.

When an extension executes, it may use any of the resources to which it has access, and may use them in harmful ways or in ways that the extendable application does not expect. Extensions which are loaded into the same process in which the extendable application is executing share all the resources (including core memory, for example) of the extendable application with the extendable application. This may very easily wreak havoc with the functions of the extendable application. Robustness of the extendable application is compromised because any fault or error in the extension may cause the extendable application to fail. While extensions which are loaded into their own process do not share in-core memory with the extendable application, improving robustness of the extendable application, in general, the extension will have access to the whole set of resources on the machine on which they execute. This occurs because, typically, access to resources is controlled by access control lists (ACLs) specifying a user's ability to read/change, etc. a particular resource. In such operating systems, a process is started with a set of credentials identifying the user they work for. The operating system uses those credentials to determine whether to grant or deny access to a resource when a process uses the resource name in an access request operation (e.g., opening a file, given its file name).

SUMMARY

The operating system organizes software so the set of extensions for an extendable application can be dynamically discovered and the extension can be run securely. Extensions are run as separate applications (e.g., within their own separate isolated process instead of within the extendable application's process). Extensions are discoverable to an activating extendable application by querying a category catalog. A category, as used herein is uniquely identified and provides at least a partial description of a contract between an activating software entity (e.g., an application capable of extension) and a software entity that is activated by the activating software entity (e.g., an extension of the application). Some provisions of the contract described in the category may apply to the activated software entity and represent aspects of the contract implemented by the activated software entity. Some provisions of the contract described in the category may apply to an activating software entity (the application capable of extension) that activates another software entity (the extension) according to the contract. The category may enumerate a set of configuration settings associated with the contract that may be used to set up an isolated execution environment for the activated software entity. The category may also specify one or more extension points to be used for communication between the activating and activated software entities. The category may also include a list of software entities that implement the category.

A software entity that is an application capable of extension may specify one or more extension points for one or more extensions. The extendable software entity specifies at least one category associated with each extension point. Thus, the operating system is informed of the relationship between an extendable application and the category representing an extension point of the extendable application. A software entity that is an extension lists the category or categories it implements. A software item that implements a category can then be activated under that category. By using the list of categories declared by a software entity, the operating system can associate a category with the set of software entities capable of implementing the category and thus is able to provide a list of appropriate extensions to an extendable application. By accessing the configuration settings of the category, the operating system can build an isolation environment for an extension that is executed under one of the categories the extension implements. Because the extension is executed in a separate, isolated environment, in accordance with the contract between extension and extendable application, the following results may be realized: execution errors of the extension do not manifest as execution errors of the extendable application, functions of the extendable application are not disrupted because of the sharing of in-core memory between extension and extendable application, and extension resources are more separable from resources of the extendable application. Additionally, actions by the extension which are unexpected by the extendable application are reduced because the universe of resources available to the extension are limited.

DETAILED DESCRIPTION

Overview

In order for an application to initiate execution of an extension, an understanding between the extension(s) built for a particular extension point and the extendable application that publicizes the extension point should exist so that the extendable application and extension(s) can cooperate constructively. This set of understandings is referred to as a contract associated with the extension point. One extendable application may publish one or more extension points. One or more extensions may access the same extension point. One or more extendable applications could publish the same extension point.

An operating system in accordance with some embodiments of the invention is aware of what extensions are available for a particular extension point, and, thus, as a consequence, for all extendable applications declaring that extension point. The operating system dynamically determines available extensions for an extendable application and loads an extension into its own isolated execution environment when the extension is activated. Available extensions for an extendable application are determined by querying a catalog of categories. Each category includes the following information: an at least partial description of a contract, the extension point associated with the contract (and with the category) and a list of software units that adhere to the contract (e.g., software units that implement the category). During execution of the application when the need for an extension for a particular extension point arises, the operating system determines a set of available extensions that implement the category. An isolated execution environment is created for an activated extension. Resources accessible to the extension may be limited to only those required by the extension to execute. The application may pass a handle to a resource such as an open file to the extension. In this way, extensions are provided controlled access to only those resources that the application determines the extension should have.

Exemplary Computing Environment

Figure 1:
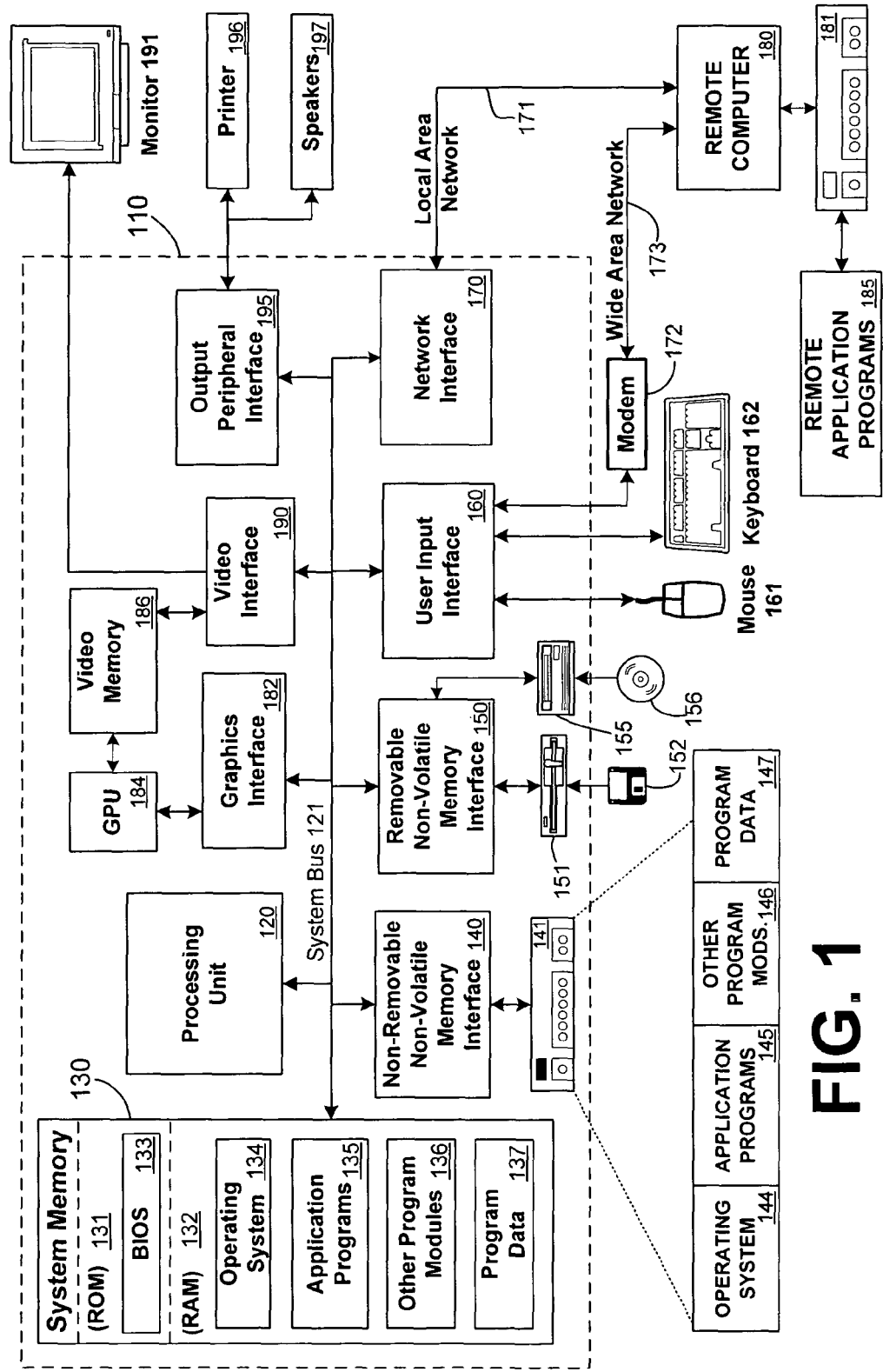
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Isolating Application Extension Execution

Figure 2:
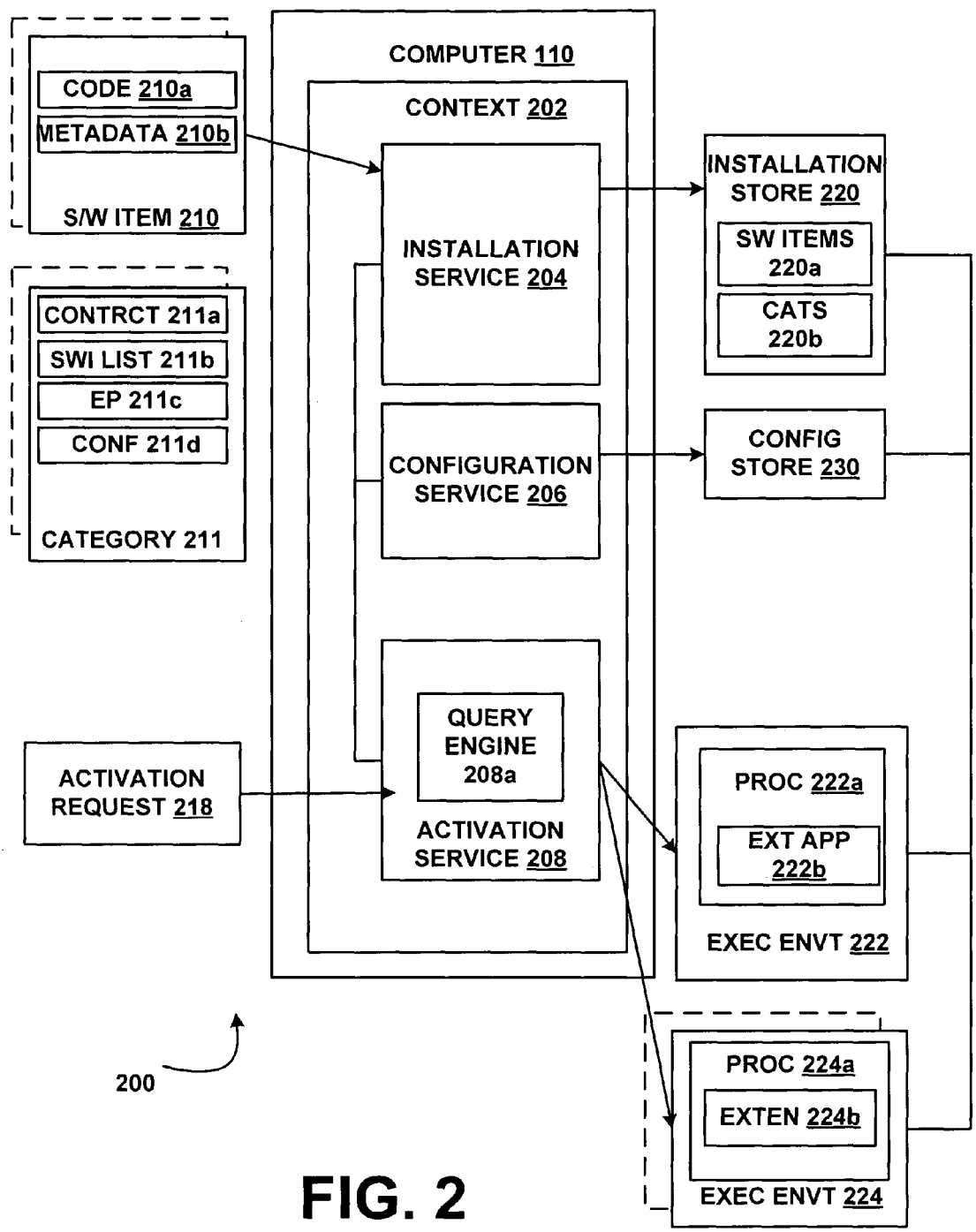
FIG. 2 is a block diagram of a system for isolating application extensions in accordance with some embodiments of the invention.

FIG. 2 illustrates one embodiment of a system 200 for isolating application extension execution as described above. System 200 may reside on a computer such as computer 110 described above with respect to FIG. 1. In FIG. 2, an operating system comprising a context 202 may include one or more of the following: an installation service 204, a configuration service 206, an activation service 208. In some embodiments of the invention, the operating system manages software units called software items. A software item such as software item 210 may include software code 210a and metadata 210b packaged into a single unit. Metadata 210b may include one or more of: dependencies of the software, a list of other resources needed by the software code 210a to execute, one or more categories that the software item implements, one or more categories the software item uses for one or more extension points and the one or more extension points.

A software item may comprise an executable unit of code and its metadata packaged together into a uniquely-identified unit. A software item may represent or comprise, for example, an application that is capable of extension. The software item representing the extendable application may publish one or more extension points for extending the extendable application and may use a uniquely-identified category when that particular extension point is used to activate an extension. The relationship between extension point and category to be used for that extension point may be included in the metadata of the extendable application software item.

Another executable type of software item may represent or comprise an extension. An extension extends the base functionality of an extendable application, is typically not known when the extendable application is written or installed and is activated sometime during the execution of the extendable application, not necessarily when the extendable application is activated. For example, the extension may be activated when a need for the extension arises during execution of the extendable application or when the extension is discovered by the extendable application. A software item that is an extension may declare in its metadata categories which it implements.

Another possible type of relationship between software items is a dependency. A dependency refers to a software unit on which another software unit relies for its base functionality. For example, an extendable or non-extendable application may rely on another software item in order to execute and perform its basic functionality. The software unit relied on by the extendable or non-extendable application is referred to as a dependency of the extendable or non-extendable application. A dependency, unlike an extension, is known at the time the application is written (coded) so that the dependencies required by an application are known when the application is installed and activated. Dependencies are loaded into an execution environment at the time the extendable or non-extendable application is loaded and is activated when the application is activated.

Another type of software item created and maintained by the installation service 204 may represent a category (e.g., category 211). A category 211 is an unexecutable software item that provides one or more of the following pieces of information: at least a partial description of a contract 211a including aspects to which an activating or extendable application adheres and aspects to which an extension to the extendable application adheres, a set of software items that implement the contract (e.g., extensions) 211b, and at least one extension point 211c. The category may also include configuration settings 211d used to create an isolated execution environment 224 separate from the extendable application's execution environment 222 in which an extension may be activated under that category (category 211).

Software items may be stored in an installation store 220. Executable software items such as dependencies, extendable and non-extendable applications and extensions may be stored in a software items store 220a portion of an installation store 220 and category-type software items may be stored in a category store 220b portion of the installation store 220 or the two types of software items may be stored together (intermingled within the store). Alternatively, separate stores may be maintained for executables and categories.

An installation service (e.g., installation service 204) keeps track of one or more of the following: what software is installed within the context, what extension points the software publishes for extensions (if any), what categories the software implements or uses for each particular extension point. The installation service also may keep track of uniquely-identified category information including one or more of: at least a partial description of a contract between an extendable application and an extension to the extendable application, an extension point for the extension, a list of software items (extensions) that implement that particular category and configuration settings for creating a separate, isolated execution environment for an extension running under that category. The installation service may also keep track of what resources are needed by the software to run, dependency information and other information. The installation service 204 may also install, remove, and service software and may make installed software available to the activation service 208. Servicing software makes a newer version of the software available to the system, and may include the installation of the newer version of the software and organizing and storing the metadata associated with the new software. The installation service may store installed software in an installation store 220.

Software available within the context 202 may include software installed within a parent context installation store (not shown). That is, contexts may be linked or arranged hierarchically to form a directed acyclic graph. The ability to access software can be inherited through creation of a parent/child hierarchy. In general if a context such as Context U is linked to another context, Context S, where Context S is the parent of Context U, the software items installed in Context S are visible to Context U so that the set of software items available in Context U is the union of those available in Context U and those available in Context S.

When an extendable application in initiated, the installation service 204 provides the activation service 208 with the software (e.g. dependencies) required for the extendable application to run. In some embodiments of the invention, only those resources declared by the software are connected to the execution environment, so that an isolated execution environment is created for the extendable application. During execution of the extendable application, the installation service 204 may receive a request from the activation service for a list of extensions for a specified extension point for activation under a particular category. The installation service 204 retrieves the list of software items (extensions) that implement that category and returns the results to the activation service 208. When an extension is activated, the installation service 204 provides the activation service 208 with the software (e.g., the extension and its dependencies) needed for the extension to run. In some embodiments of the invention, only those resources declared by the software are connected to the execution environment, so that an isolated execution environment is created for the extension. The access rights to these resources may be modified by the extendable application activating the extension. The installation service 204 also may provide the configuration settings for creation of an isolated execution environment for the extension that is separate from the execution environment of the extendable application. The installation service 204 may provide configuration settings for the extension which are associated with the category under which the extension is activated from the category information stored in the installation or category store.

The configuration service 206 maintains, manages and mediates configuration settings associated with the software. Before an application is activated, its properties must be initialized to proper values. The process of setting these values is called configuration. In some embodiments of the invention, property values for an application are stored in a configuration store 230. When an application is activated, the configuration service 206 provides configuration settings for the application from the configuration store 230 to the activation service 208. When an extension for an application is available, configuration settings for the extension are provided from the configuration store 230 to the activation service 208.

The activation service 208 may receive an activation request 218 for activation of an extendable application, receive software items required for the execution of the basic functionality of the extendable application (dependencies) from the installation service 204, receive configuration settings for the extendable application from the configuration service 206, and create an execution environment 222 for the extendable application 222*b*. During execution of the extendable application, the activation service 208 may also query the installation service 204 to determine what software extensions are available for the extendable application. During execution of the extendable application 222*b*, the query engine 208*a* of activation service 208 may send a request to the installation service 204 for these extensions (e.g., for a particular extension point, and specifying a category under which the extension would be run). Upon receiving the results from the installation service 204, the activation service 208, may construct an isolated execution environment separate from the extendable application's execution environment 222, using configuration settings associated with the specified category received from the installation service 204. The activation service 208 may then activate the appropriate extension 224*b* in its execution environment 224.

The activation service 208 may also resolve configuration settings received from the configuration service 206 (for extendable applications) and provide the process 222*a* (an executing instance of the application) with the values needed for the application to run. Similarly the activation service 208 may also resolve configuration settings received from the installation service 204 (for extensions running under a particular category) and provide the process 224*a* with the values needed for the extension to run. The activation service 208 may also resolve dependencies, determine if all dependencies are satisfied and if all required dependencies are available load the software satisfying the dependencies received from the installation service 204 into the execution environment. The activation service 208 connects the resources declared by the software (e.g., in its metadata) to the execution environment. The one or more extensions are restricted to the set of resources to which the hosting application provides them. For example, a hosting application may provide the extension with a READ ONLY handle to a file and may specify where the extension should place output results.

Figure 3:
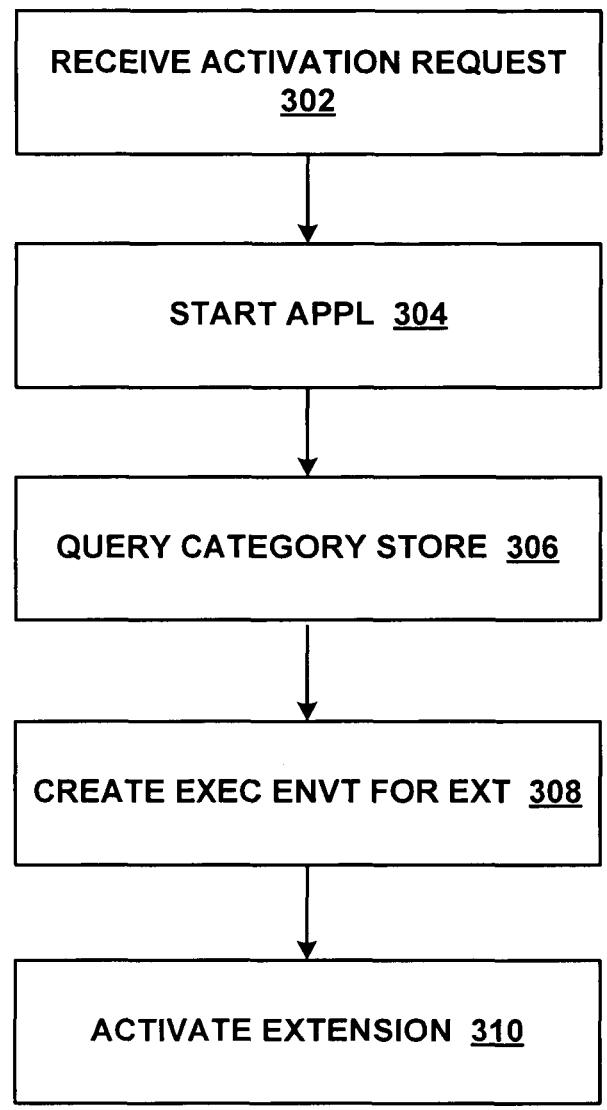
FIG. 3 is a flow diagram of a method for isolating application execution in accordance with some embodiments of the invention.

FIG. 3 illustrates a method 300 for isolating extension execution in accordance with some embodiments of the invention. At 302 a request to activate an application or piece of software such as a software item is received. Suppose, for example, a request to activate an extendable application is received. Suppose further that the extendable application provided an extension point for an extension to be activated and indicated that the extension should be activated under a particular category. At 304, an execution environment is created for the application according to configuration settings for the application received from the configuration service and the extendable application is activated. During execution of the extendable application, a need may arise for the extension. At 306 a query may be sent to determine extensions implementing the indicated category which are available for the particular extension point. The query may be sent from a query engine of an activation service to an installation service, as described above. The installation service may examine its catalog of categories and return to the activation service one or more extensions that implement the category, as described above. At 308, results are received by the activation service. In some embodiments of the invention, the results include one or more extensions and configuration settings for creation of an isolated execution environment that is separate from the execution environment of the extendable application. The execution environment for the extension is created and at 310 the extension is activated. It will be appreciated that one or more of the above listed actions may be optional or skipped and that the actions may proceed in a sequence other than that depicted in FIG. 3.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for securely executing a first extension of a first extendable application comprising:
 a processor;
 an installation service separate from the first extendable application and the first extension that maintains a catalog of categories, each category having a respective extendable application and one or more respective extensions that implement the category
 wherein the installation service separate from the first extendable application and the first extension maintains, for each category in the catalog, information including at least a partial description of a contract between the respective extendable application and the one or more respective extensions, an extension point for the respective extendable application, a list of the one or more respective extensions, and configuration settings for creating a separate, isolated execution environment for the one or more respective extensions; and an activation service that creates a first execution environment for the first extendable application and a second execution environment different from the first execution environment for the first extension, wherein the first extendable application specifies a first category, wherein the activation service queries the installation service separate from the first extendable application and the first extension for a list of extensions that implement the first category, wherein the installation service returns the list of extensions that implement the first category, and wherein the list comprises the first extension.

2. The system of claim 1, wherein the activation service creates the second execution environment for the first extension by applying the configuration settings of the first category.

3. The system of claim 2, wherein the second execution environment is an isolated execution environment, wherein resources available to the first extension are limited to those declared by the first extension, as modified by the first extendable application.

4. The system of claim 1, wherein the installation service stores software units, wherein a software unit comprises executable code and a list of resources declared by the software unit, declared resources comprising resources required by the executable code to execute.

5. The system of claim 4, wherein the software unit is an extendable application.

6. The system of claim 4, wherein the software unit is an extension to an extendable application.

7. The system of claim 1, wherein resources required by the first extension to execute are declared by the first extension.

8. A method for securely executing a first extension of a first extendable application comprising:

maintaining, by an installation service separate from the first extendable application and the first extension, a catalog of categories, each category having a respective extendable application and one or more respective extensions that implement the category, wherein the installation service separate from the first extendable application and the first extension maintains, for each category in the catalog, information including at least a partial description of a contract between the respective extendable application and the one or more respective extensions, an extension point for the respective extendable application, a list of the one or more respective extensions, and configuration settings for creating a separate, isolated execution environment for the one or more respective extensions;

creating a first execution environment for the first extendable application;

querying the installation service for a list of extensions that implement a first category specified by the first extendable application;

receiving, from the installation service, the list of extensions that implement the first category, wherein the list comprises the first extension; and creating a second execution environment different from the first execution environment for the first extension.

9. The method of claim 8, further comprising:

receiving an activation request for the first extendable application.

10. The method of claim 8, wherein the first extendable application limits a set of resources accessible to the first extension by passing an open handle to a resource to the first extension.

11. A computer-readable medium excluding carrier waves for executing a first extension of a first extendable application, the computer-readable medium having program code stored thereon that, when executed by a computing environment, causes the computing environment to:

maintain, by an installation service separate from the first extendable application and the first extension, a catalog of categories, each category having a respective extendable application and one or more respective extensions that implement the category, wherein the installation service separate from the first extendable application and the first extension maintains, for each category in the catalog, information including at least a partial description of a contract between the respective extendable application and the one or more respective extensions, an extension point for the respective extendable application, a list of the one or more respective extensions, and configuration settings for creating a separate, isolated execution environment for the one or more respective extensions;

create a first execution environment for the first extendable application;

query the installation service for a list of extensions that implement a first category specified by the first extendable application;

receive, from the installation service, the list of extensions that implement the first category, wherein the list comprises the first extension; and create a second execution environment different from the first execution environment for the first extension.

12. The computer-readable medium of claim 11, having further program code stored thereon, that when executed by the computing environment, causes the computing environment to:

pass an open handle to a resource from the first extendable application to the first extension.

13. The computer-readable medium of claim 11, having further program code stored thereon, that when executed by the computing environment, causes the computing environment to:

receive an activation request for the first extendable application.

14. The computer-readable medium of claim 11, having further program code stored thereon, that when executed by the computing environment, causes the computing environment to:

generate the second execution environment according to configuration settings of the first category and activate the first extension in the second execution environment.

* * * * *